(12) United States Patent
Konno

(10) Patent No.: US 11,368,613 B2
(45) Date of Patent: Jun. 21, 2022

(54) CONTROL APPARATUS, IMAGE PICKUP APPARATUS, AND CONTROL METHOD

(71) Applicant: CANON KABUSHIKI KAISHA, Tokyo (JP)

(72) Inventor: Yoshihiko Konno, Tachikawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/896,568

(22) Filed: Jun. 9, 2020

(65) Prior Publication Data
US 2020/0389599 A1    Dec. 10, 2020

(30) Foreign Application Priority Data

Jun. 10, 2019  (JP) .............................. JP2019-107888

(51) Int. Cl.
*H04N 5/232* (2006.01)
*G03B 13/36* (2021.01)

(52) U.S. Cl.
CPC ....... *H04N 5/232121* (2018.08); *G03B 13/36* (2013.01); *H04N 5/232127* (2018.08)

(58) Field of Classification Search
CPC ....... H04N 5/232121; H04N 5/232127; H04N 5/36961; H04N 5/232133; H04N 5/23209; H04N 5/232122; H04N 5/232123; G03B 13/36; G03B 19/12
See application file for complete search history.

(56) References Cited

U.S. PATENT DOCUMENTS

| | | | | |
|---|---|---|---|---|
| 2007/0269197 A1* | 11/2007 | Ide | ......................... | G03B 13/36 396/125 |
| 2009/0040354 A1* | 2/2009 | Takanashi | .......... | H04N 5/23212 348/308 |
| 2012/0163786 A1* | 6/2012 | Murashima | ........ | H04N 5/23212 396/91 |
| 2012/0268647 A1* | 10/2012 | Nakagawa | ............... | G02B 7/36 348/349 |
| 2012/0281131 A1* | 11/2012 | Isobe | ............... | H04N 5/232123 348/345 |
| 2013/0258168 A1* | 10/2013 | Aoki | .................. | H04N 5/36961 348/349 |
| 2015/0195446 A1* | 7/2015 | Saito | ........................ | G02B 7/34 348/353 |
| 2016/0150153 A1* | 5/2016 | Sakurabu | ......... | H04N 5/232122 348/353 |

(Continued)

FOREIGN PATENT DOCUMENTS

JP    4378141 B2    12/2009

*Primary Examiner* — Abdelaaziz Tissire
(74) *Attorney, Agent, or Firm* — Cowan, Liebowitz & Latman, P.C.

(57) ABSTRACT

A control apparatus includes a first calculating unit configured to calculate a defocus amount by a focus detection of a phase difference method, a second calculating unit configured to calculate a contrast evaluation value of an image, a third calculating unit configured to calculate a function indicating a relationship between the defocus amount and the contrast evaluation value calculated at each of a plurality of lens positions, and a fourth calculating unit configured to calculate an adjusting value of the defocus amount based on an extreme value of a function.

10 Claims, 11 Drawing Sheets

(56) References Cited

U.S. PATENT DOCUMENTS

| | | | |
|---|---|---|---|
| 2016/0198107 A1* | 7/2016 | Yamazaki | H04N 5/23229 348/350 |
| 2018/0152620 A1* | 5/2018 | Ito | H04N 5/232122 |
| 2018/0183991 A1* | 6/2018 | Li | H04N 5/232122 |

* cited by examiner

FOUR-PIXEL CONFIGURATION

ENTIRE IMAGE SENSOR 52

CONTROL APPARATUS, IMAGE PICKUP APPARATUS, AND CONTROL METHOD

BACKGROUND OF THE INVENTION

Field of the Invention

The present invention relates to an image pickup apparatus having a micro adjusting function that automatically adjusts a parameter relating to the autofocus (AF).

Description of the Related Art

There has conventionally been known an image pickup apparatus that has an AF function and moves an image pickup lens to an in-focus position based on a detection result by an AF detector. This AF function allows an error at an indifferent level for actual image pickup. However, in an image pickup apparatus that enables a captured image to be checked by enlarging it, an AF residual error due to a lens manufacturing error or the like is conspicuous. In particular, in a single-lens reflex camera system, both the camera body and the image pickup lens include manufacturing errors and adjusting values errors. Hence, the AF in a combination of the single-lens reflex camera and the image pickup lens may have a focus error larger than a permissible value.

Accordingly, for example, Japanese Patent No. ("JP") 4378141 discloses a calibration technology that displays images captured at a plurality of lens positions, and corrects an AF defocus amount during image pickup based on the defocus amount in the AF detection corresponding to the image selected by the user.

In the technology disclosed in JP 4378141, the user selects a reference defocus amount from among several captured images acquired during the calibration. Hence, if there is the best position between the captured images, information on the best position cannot be obtained. When the user selects the defocus amount, the selection accuracy scatters depending on the physical condition of the user, the object, and the like, and the selection itself places a burden on the user. Regarding the several captured images acquired by intermittently moving the lens during the calibration, a lens driving amount itself also scatters and thus the calibration may scatter.

SUMMARY OF THE INVENTION

The present invention provides a control apparatus, an image pickup apparatus, and a control method, each of which can perform a highly accurate micro adjustment in the autofocus.

A control apparatus according to one aspect of the present invention includes a first calculating unit configured to calculate a defocus amount by a focus detection of a phase difference method, a second calculating unit configured to calculate a contrast evaluation value of an image, a third calculating unit configured to calculate a function indicating a relationship between the defocus amount and the contrast evaluation value calculated at each of a plurality of lens positions, and a fourth calculating unit configured to calculate an adjusting value of the defocus amount based on an extreme value of a function. At least one processor or circuit is configured to perform a function of at least one of the units. An image pickup apparatus having the above control apparatus also constitutes another aspect of the present invention.

A control method according to another aspect of the present invention includes calculating a defocus amount by a focus detection of a phase difference method, calculating a contrast evaluation value of an image, calculating a function indicating a relationship between the defocus amount and the contrast evaluation value calculated at each of a plurality of lens positions, and calculating an adjusting value of the defocus amount based on an extreme value of a function. A non-transitory computer-readable storage medium storing a program for causing a computer to execute the above control method also constitutes another aspect of the present invention.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention.

First Embodiment

Figure 1:
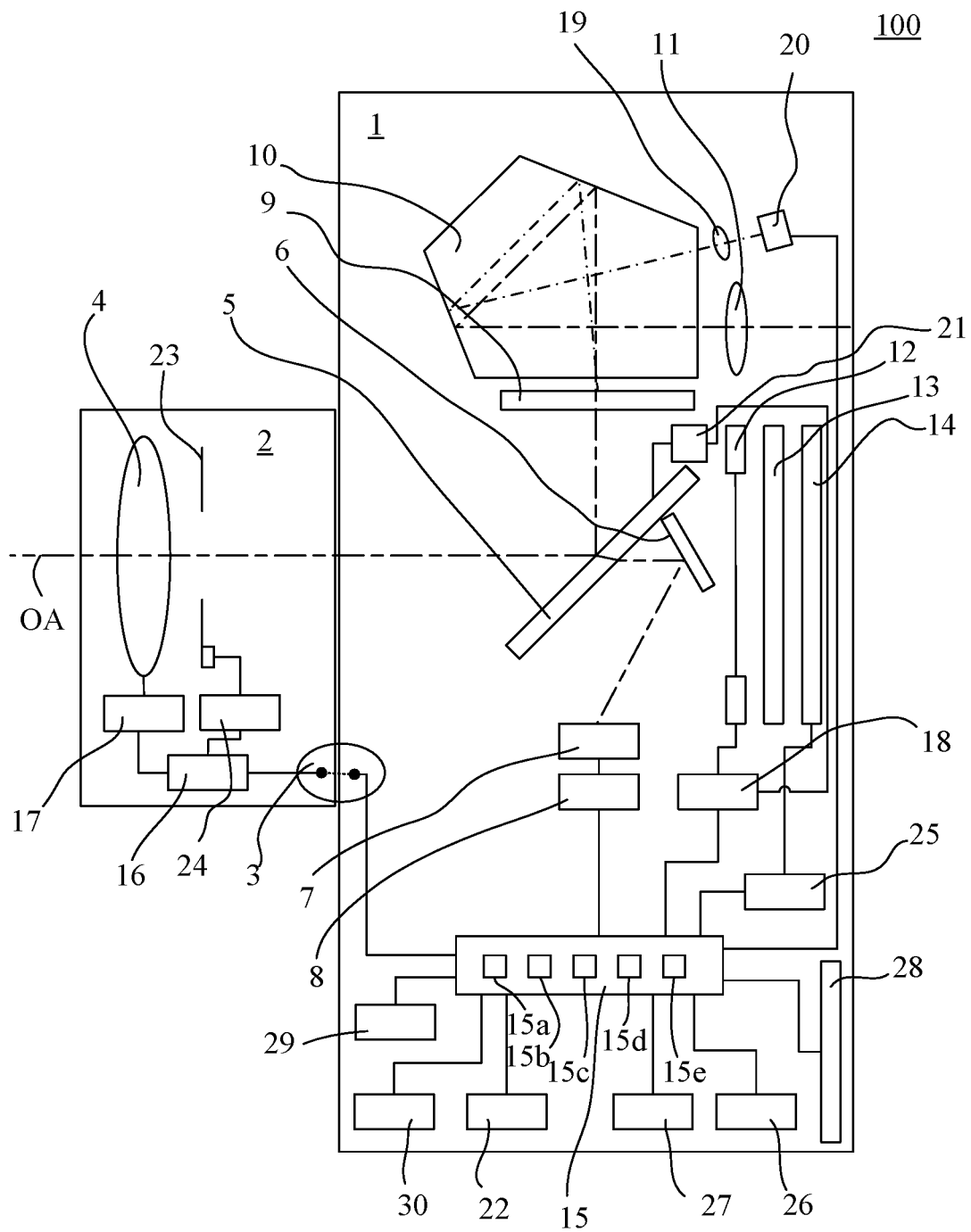
FIG. 1 is a block diagram of an image pickup apparatus according to a first embodiment.

Referring now to FIG. 1, a description will be given of an image pickup apparatus according to a first embodiment of the present invention. FIG. 1 is a block diagram of an image pickup apparatus 100 according to this embodiment. The image pickup apparatus 100 is a lens interchangeable type single-lens reflex camera having a micro adjusting function for the AF. The image pickup apparatus 100 includes a camera body 1, and an interchangeable lens (lens apparatus) 2 that is detachable from the camera body 1. However, this embodiment is also applicable to an image pickup apparatus in which a camera body and a lens apparatus are integrated with each other.

The interchangeable lens 2 is detachably attached to the camera body 1 via a mount (not illustrated). A telecommunication unit 3 is provided to the mount. The camera body 1 communicates with the interchangeable lens 2 via the telecommunication unit 3, and controls a focus lens 4 and a diaphragm (aperture stop) 23 that constitute an imaging optical system in the interchangeable lens 2.

A light beam from an object passes through the focus lens 4 in the interchangeable lens 2 and is guided to a quick return mirror 5 in the camera body 1. The quick return mirror 5 is disposed obliquely to an optical axis OA in the image pickup optical path, and is movable between a first position (a position illustrated in FIG. 1) for guiding the light beam from the object upwardly and a second position retracted to the outside of the image pickup optical path. The quick return mirror 5 is a half-mirror. When the quick return mirror 5 is located at the first position, part of the light beam from the object passes through the quick return mirror 5. The light beam branched from the imaging light beam is reflected by a sub mirror 6 behind the quick return mirror 5 and guided to an AF sensor 7 constituting an AF unit (focus detecting unit) together with a focus detecting circuit 8. The focus detecting circuit 8 performs a focus detection using the AF sensor 7.

Figure 2:
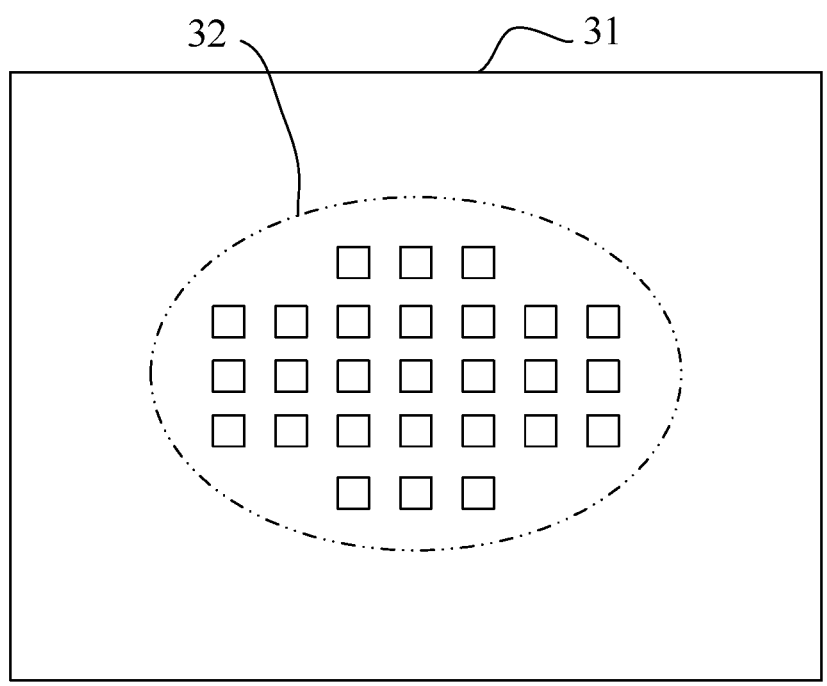
FIG. 2 is a layout diagram of focus detecting points in an image to be captured according to each embodiment.

Referring now to FIG. 2, a description will be given of focus detecting points in an image to be captured. FIG. 2 illustrates an arrangement of the focus detecting points in the image to be captured. In FIG. 2, reference numeral 31 denotes an image range, and twenty-seven inner squares surrounded by an alternate long and two short dashes line 32 represent focus detecting points at which a focus detection is available. The focus state of the image pickup lens 2 is detected at the selected one of these focus detecting points.

On the other hand, the light beam reflected on the quick return mirror 5 forms an image on a focusing screen 9 and reaches the user's eye via a pentaprism 10 and an eyepiece 11. When the quick return mirror 5 is located at the second position, the light beam from the image pickup lens 2 reaches an image sensor 14 via a focal plane shutter 12 and an optical filter 13. The image sensor 14 has a photoelectric conversion element such as a CMOS sensor, and photoelectrically converts an optical image (object image) formed via an imaging optical system.

The optical filter 13 serves as an infrared cut and an optical low-pass filter. The focal plane shutter 12 has a front curtain and a rear curtain, and controls an exposure amount to the image sensor 14 by controlling the transmission and blocking of the light beam from the image pickup lens 2. When the quick return mirror 5 is located at the second position, the sub mirror 6 is also folded at the same time and retracted from the image pickup optical path.

The camera body 1 has a system controller (control apparatus) 15 that controls the entire camera body 1. The system controller 15 includes a defocus amount calculator (first calculating unit) 15a, an evaluation value calculator (second calculating unit) 15b, a function calculator (third calculating unit) 15c, an adjusting value calculator (fourth calculating unit), and a focus controller (focus control unit) 15e. The functions of these units will be described later.

The system controller 15 communicates with a lens control circuit 16 in the image pickup lens 2 via the telecommunication unit 3. The lens control circuit 16 controls a lens driver 17 to drive the focus lens 4 for focusing according to a signal from the system controller 15, and controls the diaphragm 23 via a diaphragm control circuit 24. The system controller 15 is connected to a shutter controller 18. The shutter controller 18 controls a mirror driving mechanism 21 and the focal plane shutter 12 in accordance with a signal from the system controller 15, and controls folding and unfolding of the quick return mirror 5 and the sub mirror 6 and traveling of the focal plane shutter 12.

A photometric lens 19 and a photometric circuit 20 perform a photometric operation of observing the focusing screen 9 from a position where the finder optical system is viewed from the eye, and of measuring the brightness of the object. The photometric value (metered light value) resulting from the photometric operation is sent to the system controller 15. The system controller 15 is connected to a nonvolatile memory (or storage) 22 for storing adjusting values of the camera body 1. The nonvolatile memory 22 includes a flash memory. The nonvolatile memory 22 stores an AF adjusting value $x_\alpha$ to be described later. The focus detecting circuit 8 is connected to the system controller 15.

An image capturing circuit 25 captures (takes in) an image by controlling the image sensor 14 based on an instruction from the system controller 15. A temporary (storing) memory 26 is used as a work memory of the system controller 15 and also temporarily stores an image or the like captured by the image capturing circuit 25. A removable memory card 27 stores a captured image. A display panel 28 includes a TFT liquid crystal panel or an organic EL panel, and displays images, menus, and the like. A release switch 29 is connected to the system controller 15 and instructs the camera body 1 to capture the image. An operation unit 30 is connected to the system controller 15, and allows a user to give various control instructions of the camera body 1.

The camera body 1 is capable of the phase difference type focus detection (phase difference AF) by the focus detecting circuit 8 and the contrast AF in which the system controller 15 performs processing based on an image captured by the image sensor 14. The AF sensor 7 has a pair of secondary image pickup lenses and a line sensor (photoelectric conversion element), and detects a defocus amount in the phase difference detection AF based on a relative shift amount of a pair of image signals formed on the line sensor. In the adjustment in the factory, the relationship between the defocus amount and the focus position of the captured image is measured and stored in the nonvolatile memory 22 as a factory adjusting value (ADO. In the phase difference AF, the focus lens 4 is moved based on the defocus amount.

The contrast AF is the autofocus performed by comparing contrast evaluation values at a plurality of lens positions. In the contrast AF operation, the image captured by the image capturing circuit 25 for each of the plurality of lens positions is stored in the temporary memory 26, the contrast of part corresponding to the focus detecting point in the image is evaluated, and the contrast peak position is set to the in-focus position.

The phase difference AF can provide a quick AF operation because the lens moving amount necessary for the in-focus is obtained from the defocus amount. On the other hand, the contrast AF is expected to provide a high focusing accuracy because the AF is performed based on the contrast value of the captured image itself, but needs a time for focusing because it is necessary to search for the in-focus point by moving the lens. The image pickup apparatus 100 according to this embodiment has an AF adjusting value setting function in addition to a normal image pickup operation function.

Figure 3:
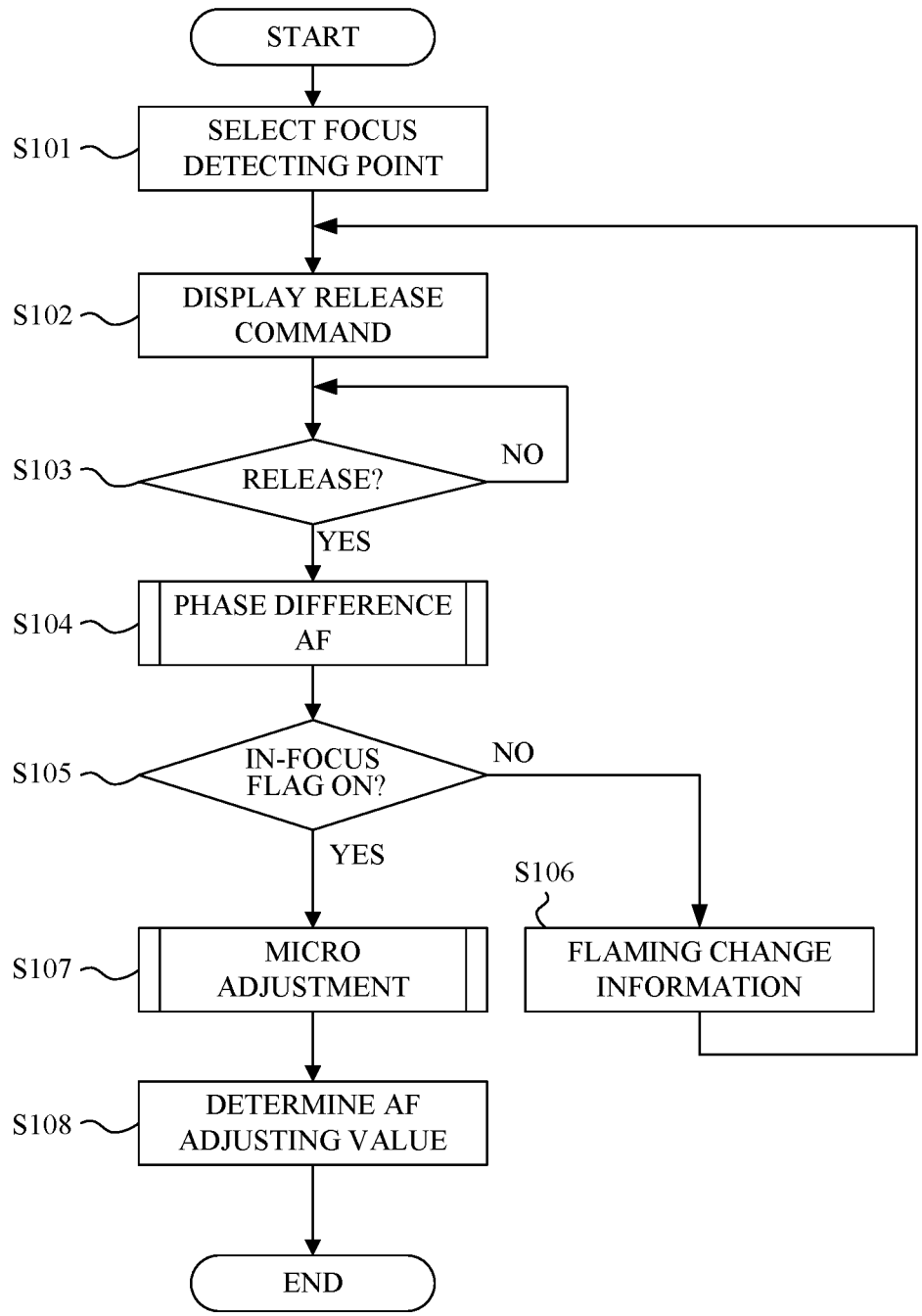
FIG. 3 is a flowchart showing AF adjusting value setting processing according to the first embodiment.

Referring now to FIG. 3, a description will be given of the AF adjusting value setting processing of the image pickup apparatus 100 according to this embodiment. FIG. 3 is a flowchart illustrating the AF adjusting value setting processing according to this embodiment. Each step in FIG. 3 is mainly executed by the system controller 15 or by each unit in the image pickup apparatus 100 based on a command from the system controller 15. The image pickup apparatus 100 according to this embodiment performs the automatic AF micro adjustment operation of automatically acquiring a defocus amount corresponding to a plurality of images during the operation and of automatically setting the AF adjusting value.

First, in the step S101, the system controller 15 displays the 27 focus detecting points illustrated in FIG. 2. The user operates the operation unit 30, and selects one focus detecting point from the 27 focus detecting points displayed on the display panel 28. Next, in the step S102, the system controller 15 displays on the display panel 28 a message "[p]ress the release switch toward an adjustment object" (display the release instruction). Next, in the step S103, the system controller 15 determines whether or not the release switch 29 has been pressed by the user. The determination in the step S103 is repeated until the release switch 29 is pressed. On the other hand, if the release switch 29 has been pressed, the flow proceeds to step S104.

Figure 4:
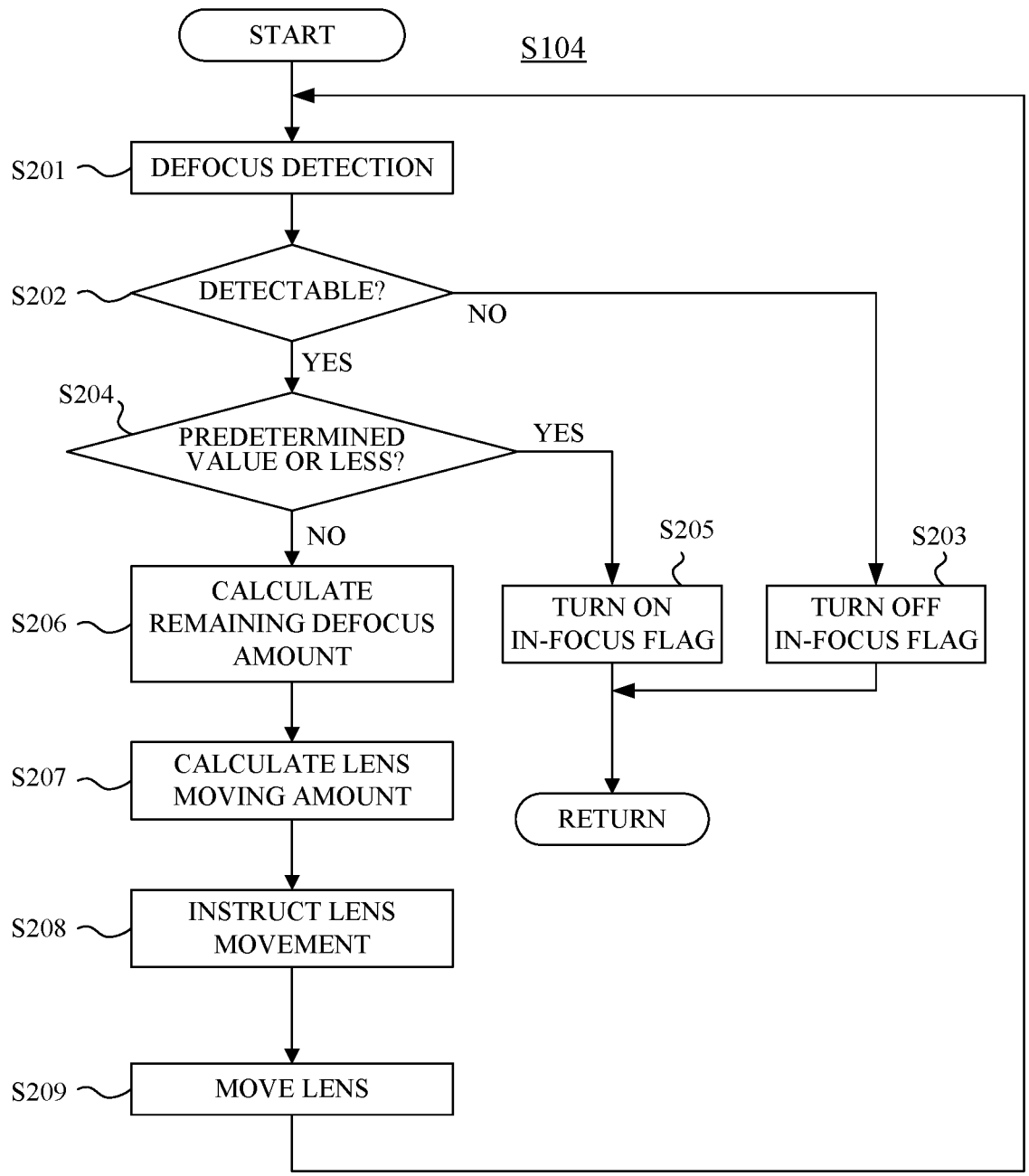
FIG. 4 is a flowchart showing an operation of a phase difference AF according to the first embodiment.

In the step S104, the system controller 15 performs the phase difference AF at the focus detecting point selected in the step S101. Referring now to FIG. 4, a detailed description will be given later of the operation of the phase difference AF. After the phase difference AF ends, the flow proceeds to the step S105.

In the step S105, the system controller 15 determines whether the AF in-focus flag is turned on. If the AF in-focus flag is turned on, the flow proceeds to the step S107. On the other hand, if the AF in-focus flag is turned off, the flow proceeds to the step S106. In the step S106, the system controller 15 displays on the display panel 28 a message of the focusing failure prompting the user to change the framing for the re-execution. Thereafter, the flow returns to the step S102.

In the step S107, the system controller 15 performs the AF micro adjustment at the focus detecting point selected in the step S101. A detailed description of the micro adjustment operation will be described later with reference to FIG. 5.

Next, in the step S108, the system controller 15 sets the adjusting value $x\alpha$ (described in detail later) obtained in the step S107 as an adjusting value corresponding to the focus detecting point selected in the step S101 and the used lens, and stores it in the memory 22. The stored adjusting value is used as an adjusting value $x_\alpha$ corresponding to the focus detecting point and the used lens for the next and subsequent AFs.

Referring now to FIG. 4, a detailed description will be given of the operation of the phase difference AF (step S104). FIG. 4 is a flowchart showing the operation of the phase difference AF (subroutine of the step S104). Each step in FIG. 4 is mainly executed by the system controller 15 or by the AF sensor 7 and the focus detecting circuit 8 based on a command from the system controller 15.

First, in the step S201, the focus detecting circuit 8 obtains a defocus amount based on a pair of image signals of the AF sensor 7 (performs a defocus detection), and outputs the defocus amount to the system controller 15. Next, in the step S202, when the defocus detection is available in the step S201, the system controller 15 proceeds to the step S204. On the other hand, if the defocus detection is unavailable, the flow proceeds to the step S203. In the step S203, the system controller 15 turns off the in-focus flag, and ends this subroutine.

In the step S204, the system controller 15 determines whether the defocus amount obtained in the step S201 (more specifically, the remaining defocus amount) is equal to or less than a predetermined value. This embodiment sets the defocus amount to Df, a difference value between the focus position stored in the nonvolatile memory 22 in the factory adjustment described above, the defocus amount to $\Delta$Df, the permissible circle of confusion to $\delta$ (=0.03 mm), and the F-number of the interchangeable lens 2 to F. Then, the predetermined value is F×$\delta$. When the following expression (1) is satisfied, the system controller 15 determines that the defocus amount has become equal to or less than the predetermined value.

$$|Df-\Delta Df| < F \times \delta \quad (1)$$

If the defocus amount is equal to or smaller than the predetermined value, the flow proceeds to step S205, where the system controller 15 turns on the in-focus flag and ends this subroutine. On the other hand, if the defocus amount is larger than the predetermined value, the flow proceeds to step S206. In the step S206, the system controller 15 obtains remaining defocus amount sDf by the following expression (2) based on the defocus amount Df and the difference value $\Delta$Df in the factory adjustment.

$$sDf = Df - \Delta Df \quad (2)$$

The difference value $\Delta$Df is a value in the factory adjustment, and an error exists when the interchangeable lens 2 actually used is used.

Next, in the step S207, the system controller 15 (focus controller 15e) moves a moving amount of the focus lens 4 necessary for the in-focus (lens moving amount) based on the remaining defocus amount sDf and the lens information obtained from the lens control circuit 16. Next, in the step S208, the system controller 15 instructs the lens control circuit 16 to move the focus lens 4 (lens movement) via the telecommunication unit 3. Next, in the step S209, the lens control circuit 16 controls the lens driver 17 based on the lens moving amount instructed by the system controller 15 to move the focus lens 4 in the optical axis direction by the instructed lens moving amount. After the movement of the focus lens 4 is completed, the flow returns to the step S201, and the system controller 15 performs the AF operation until the remaining defocus amount becomes equal to or less than the predetermined value.

Figure 5:
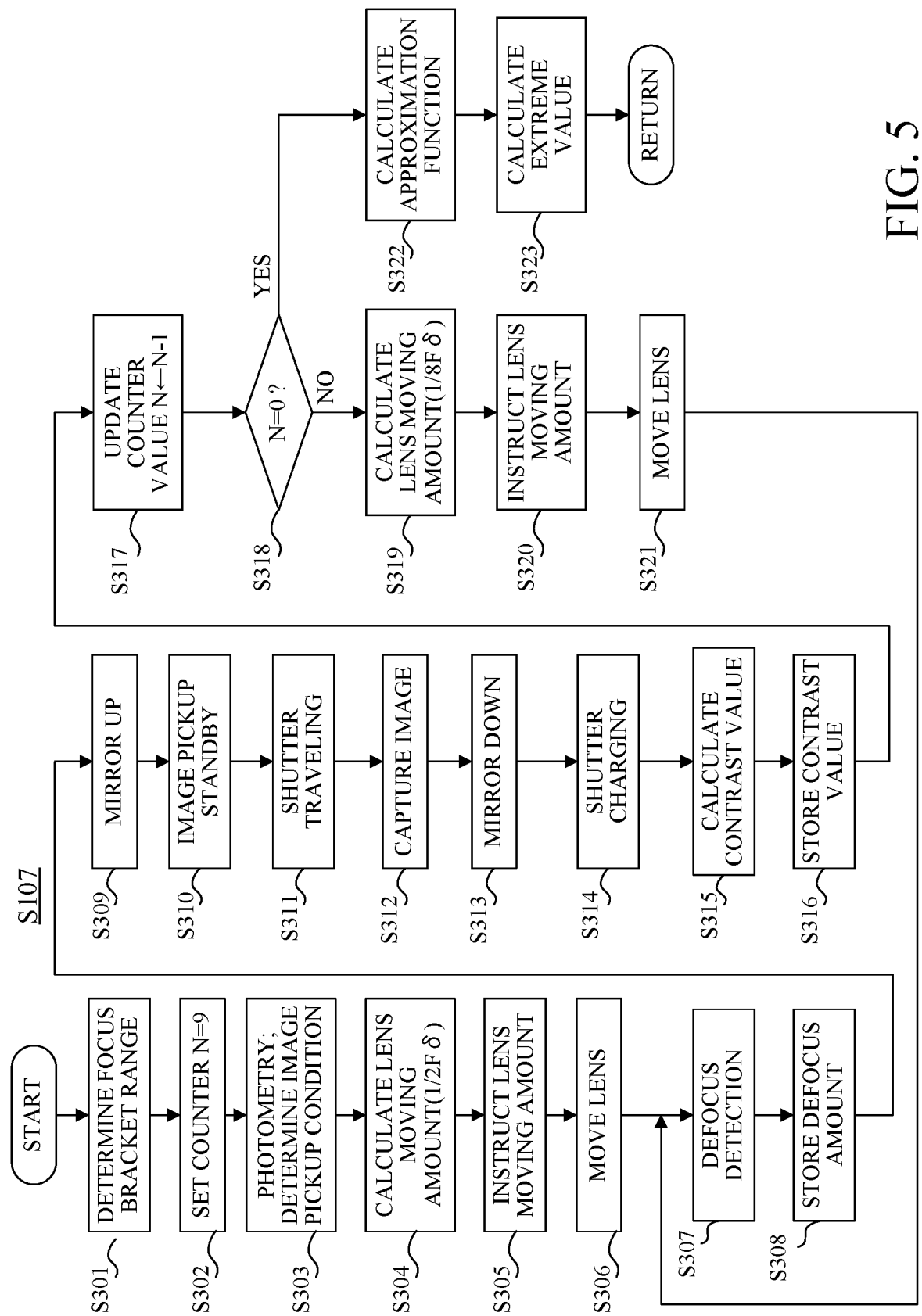
FIG. 5 is a flowchart showing an operation of micro adjustment according to the first embodiment.

Referring now to FIG. 5, a detailed description will be given of an operation of the micro adjust (step S107). FIG. 5 is a flowchart showing the operation of the micro adjustment (subroutine of the step S107). Each step in FIG. 5 is mainly executed by the system controller 15 or by each unit of the image pickup apparatus 100 based on a command from the system controller 15. In this embodiment, the micro adjustment is performed by capturing images at a plurality of positions (a plurality of lens positions) of the focus lens 4 and by simultaneously acquiring a defocus amount and a contrast evaluation value of the captured image.

First, in the step S301, the system controller 15 determines a focus bracket range (movement range and pitch of the focus lens 4). In this embodiment, a total of nine brackets are captured at a pitch of $\frac{1}{8} \times F \times \delta$ (F: F-number, $\delta$: permissible circle of confusion) in a range of $\pm\frac{1}{2} \times F \times \delta$ around the focal point as a center. Next, in the step S302, the system controller 15 sets a counter. That is, the system controller 15 sets the total number of nine sheets determined in the step S301 to the counter (N=9).

Next, in the step S303, the system controller 15 meters the object light using the photometry circuit 20. The system controller 15 determines an image pickup condition, such as the shutter speed and the sensitivity of the image sensor 14, based on the obtained photometric value. This embodiment performs the micro adjustment in the open state of the diaphragm 23 that makes narrowest the in-focus range. With a lens having a large focus shift due to the diaphragm 23, it is also possible to determine the F-number during the actual image pickup in advance and perform micro adjustment with the actual F-number.

Next, in the step S304, the system controller 15 calculates the lens moving amount to the initial lens position. More specifically, the system controller 15 calculates the lens moving amount to one end −½×F×δ of the bracket range±½×F×δ determined in the step S301. Next, in the step S305, the system controller 15 sends the lens moving amount determined in the step S304 to the lens control circuit 16. Next, in the step S306, the lens control circuit 16 controls the lens driver 17 based on the lens moving amount instructed by the system controller 15, and moves the focus lens 4 in the optical axis direction by the instructed lens moving amount. At this time, the image plane movement amount of the focus lens 4 is ideally ½×F×δ, but an error actually occurs. The error includes manufacturing scatters in the sensitivity of the focus lens 4 (various manufacturing errors such as the refractive index, curvature, and thickness of the glass material), scatters in play required for the movable member, a conversion error (in particular, which is remarkable in a zoom lens) between the image plane movement amount and the lens moving amount.

Next, in the step S307, the focus detecting circuit 8 and the defocus amount calculator 15a detect (calculate) the defocus amount based on the pair of image signals of the AF sensor 7. The calculated defocus amount is sent to the system controller 15. Next, in the step S308, the system controller 15 correlates the received defocus amount and the counter value (N) with each other and stores them in the temporary memory 26.

Next, the image pickup apparatus 100 acquires an image for the contrast evaluation. First, in the step S309, the system controller 15 performs a mirror-up operation using the mirror driving mechanism 21. Next, in the step S310, the system controller 15 resets the electric charges of the pixels of the image sensor 14 and sets them in an imaging standby state. Then, the system controller 15 sets the amplification factor of the image sensor 14 to the sensitivity determined in the step S303. Next, in the step S311, the system controller 15 uses the shutter controller 18 to move the focal plane shutter 12 at the shutter speed determined in the step S303 for the exposure. Next, in the step S312, the system controller 15 reads an image from the image sensor 14 using the image capturing circuit 25, and stores the image in the temporary memory 26. Next, in the step S313, the system controller 15 performs a mirror-down operation using the mirror driving mechanism 21. Next, in the step S314, the system controller 15 uses the shutter controller 18 to charge the shutter, and prepares for the next shutter traveling.

Next, in the step S315, the system controller 15 (evaluation value calculator 15b) calculates a contrast evaluation value at a position corresponding to the focus detecting point position instructed in the step S101 in the captured image stored in the temporary memory 26. Next, in the step S316, the system controller 15 correlates the contrast evaluation value obtained in the step S315 and the defocus amount stored in the step S308 with each other and stores them. The defocus amount is correlated performed by referring to the counter value (N) stored as a set with the defocus amount.

Since one set of data is obtained in the step S317, the system controller 15 updates the value by subtracting 1 from the counter value (N) (N←N−1). Next, in the step S318, the system controller 15 determines whether the counter value (N) is 0 (N=0). If the counter value is 0, the flow proceeds to the step S322. On the other hand, if the counter value is not 0, the flow proceeds to the step S319.

In the step S319, the system controller 15 calculates a lens moving amount corresponding to ⅛×F×δ. Next, in the step S320, the system controller 15 sends the lens moving amount calculated in the step S319 to the lens control circuit 16. Next, in the step S321, the lens control circuit 16 controls the lens driver 17 based on the lens moving amount instructed by the system controller 15, and moves the focus lens 4 in the optical axis direction by the instructed lens moving amount. The movement amount of the focus lens 4 at this time has an error similarly to the movement error in the step S306. After the movement of the focus lens 4 is completed, the flow returns to the step S307. In this loop, nine sets of the defocus amount and the contrast evaluation value are stored in the temporary memory 26.

In the step S322, the system controller 15 (function calculating unit 15c) calculates an approximate function by the least-squares method, using the defocus amount stored in the temporary memory 26 as x and the contrast value as y. Since this embodiment performs a quadratic approximation, the system controller 15 obtains a quadratic function $y=ax^2+bx+c$. Since the approximation method using the quadratic function by the least-squares method is generally known, a description thereof will be omitted. A relationship between the defocus amount and the contrast evaluation value is different from the quadratic function. Since the approximation range is a narrow range of the defocus amount, the approximation is performed by the quadratic function in this embodiment. While this embodiment uses the quadratic function for the approximate function, another function may be used.

Next, in the step S323, the system controller 15 (adjusting value calculating unit 15d) differentiates the quadratic function obtained in the step S322, and calculates a defocus amount x where the contrast value y takes an extreme value (maximum value). That is, since $x_\alpha$ that makes the differential value $y'=2ax+b=0$ of the contrast value y is an adjusting value to be solved, the adjusting value $x_\alpha$ is calculated as $x_\alpha=-b/2a$.

Figure 6:
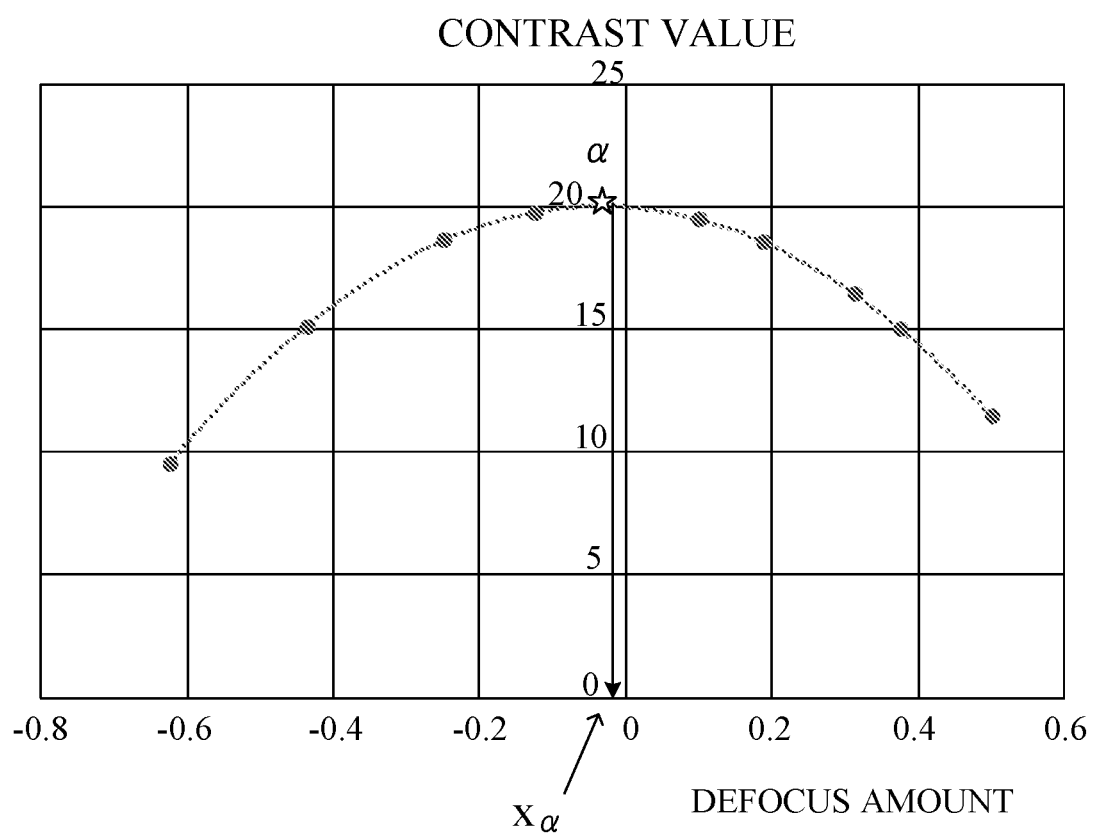
FIG. 6 is a graph showing a relationship between a defocus amount and a contrast value according to the first embodiment.

FIG. 6 is a graph illustrating the relationship between the defocus amount and the contrast value. In FIG. 6, the abscissa axis (x axis) indicates the defocus amount, and the ordinate axis (y axis) indicates the contrast evaluation value. In FIG. 6, nine points on the graph represent measurement results, and a curve is an approximate curve based on the nine points and shows a quadratic function obtained by the least-squares method. The maximum point of the contrast evaluation value is the point α at the asterisk position in the graph, and the corresponding defocus amount is $x_\alpha$. With the adjusting value $x_\alpha$ as a return value, the micro adjustment subroutine ends.

This embodiment can correct the difference between the maximum point position of the contrast evaluation value due to the individual difference of the interchangeable lens 2 and the defocus detection of the optical path branching type phase difference AF. Instead of presenting a plurality of images to the user to request him to make a determination, the image pickup apparatus 100 calculates the contrast evaluation value. Thus, the burden of the user can be relieved while the determination error of the user can be eliminated. Even if the lens driving amount varies when images are captured for the lens correction, the relationship with the contrast evaluation value is determined based on the defocus amount obtained from the lens stop position, and the evaluation that does not depend on the lens stop position is available.

Second Embodiment

Figure 7:
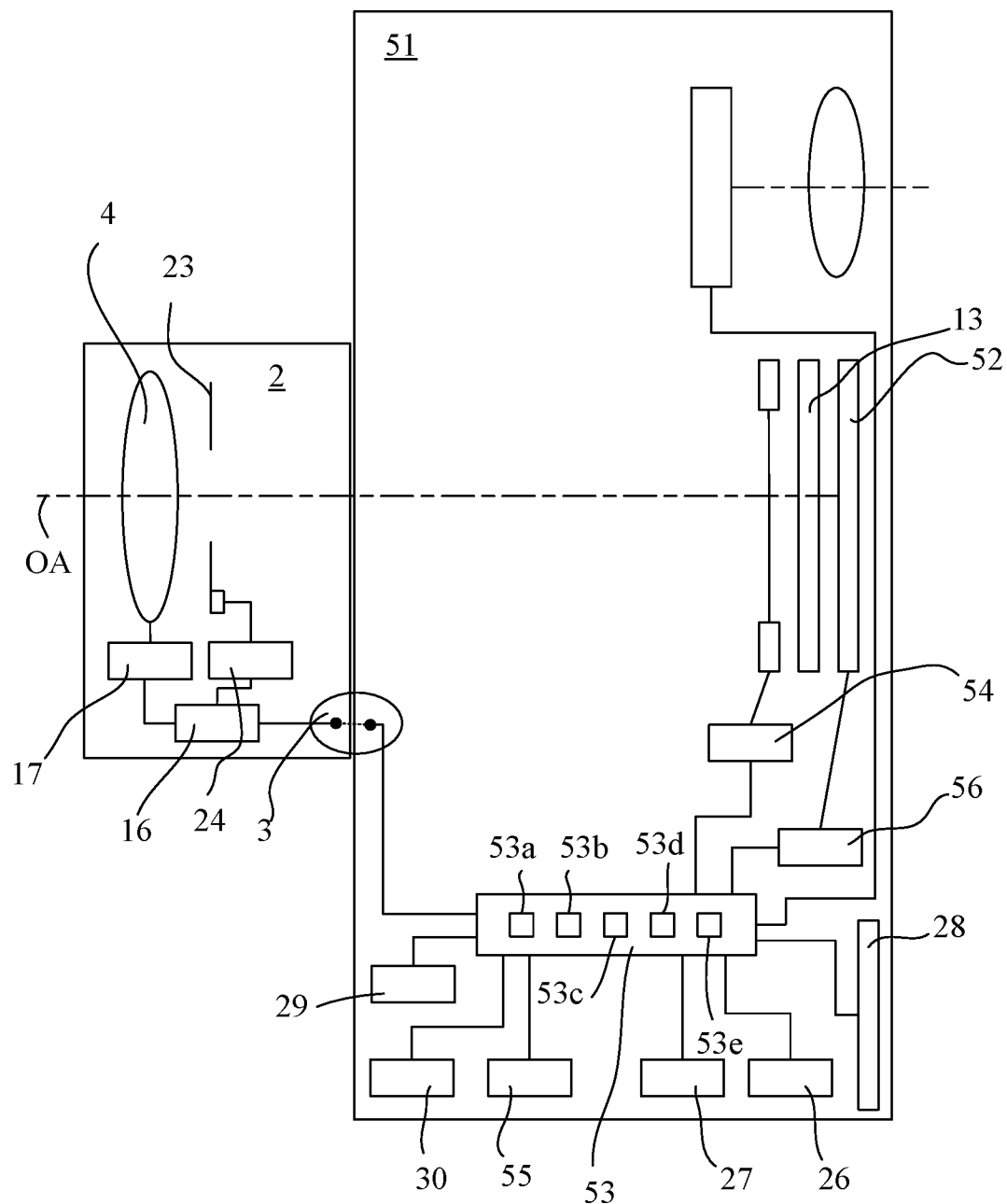
FIG. 7 is a block diagram of an image pickup apparatus according to a second embodiment.

Referring now to FIG. 7, a description will be given of an image pickup apparatus according to a second embodiment of the present invention. FIG. 7 is a block diagram of an image pickup apparatus 100a according to this embodiment. The image pickup apparatus 100a is a mirrorless (non-reflex) lens interchangeable type camera having a micro adjusting function. Those elements according to this embodiment, which are corresponding elements in the image pickup apparatus 100 according to the first embodiment, will be designated by the same reference numerals, and a description thereof will be omitted.

The image pickup apparatus 100a includes a mirrorless type camera body 51 and the interchangeable lens 2 detachable from the camera body 51. The light beam from the object passes through the focus lens 4 in the interchangeable lens 2 and reaches an image sensor 52 via the focal plane shutter 12 and the optical filter 13 in the camera body 1. The image sensor 52 includes a CMOS sensor or the like and has an imaging plane phase difference AF function. The imaging plane phase difference AF is a phase difference AF using pixels (focus detecting pixels) in the image sensor 52.

The camera body 51 has a system controller (control apparatus) 53 that controls the entire camera body 51. The system controller 53 includes a defocus amount calculator (first calculating unit) 53a, an evaluation value calculator (second calculating unit) 53b, a function calculator (third calculating unit) 53c, an adjusting value calculator (fourth calculating unit), and a focus controller (focus control unit) 53e. The functions of these units are the same as those described in the first embodiment.

The system controller 53 communicates with the lens control circuit 16 in the image pickup lens 2 via the telecommunication unit 3. A shutter controller 54 is connected to the system controller 53. The shutter controller 54 controls the focal plane shutter 12 according to a signal from the system controller 53. A nonvolatile memory 55 for storing adjusting values of the camera body 51 is connected to the system controller 53. The nonvolatile memory 55 includes a flash memory. The nonvolatile memory 55 stores calibration data of an imaging plane phase difference AF described later. An image capturing circuit 56 captures an image by controlling the image sensor 52 based on an instruction from the system controller 53. The camera body 51 has two types of AF functions using images captured by the image sensor 52. The first AF function is the above imaging plane phase difference AF, and the second AF function is the contrast AF.

Figure 8A:
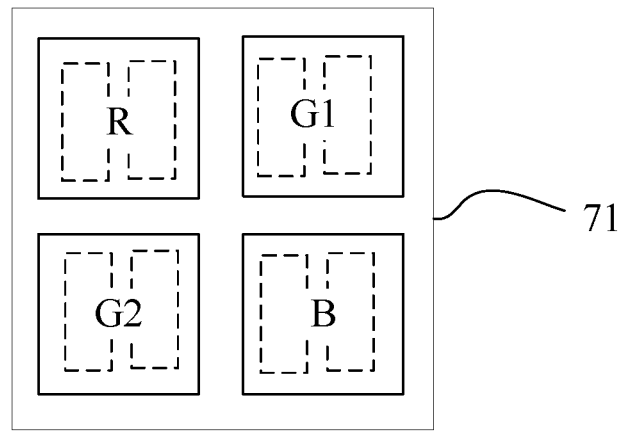
FIGS. 8A and 8B illustrate a pixel arrangement of an image sensor according to the second embodiment.
Figure 8B:
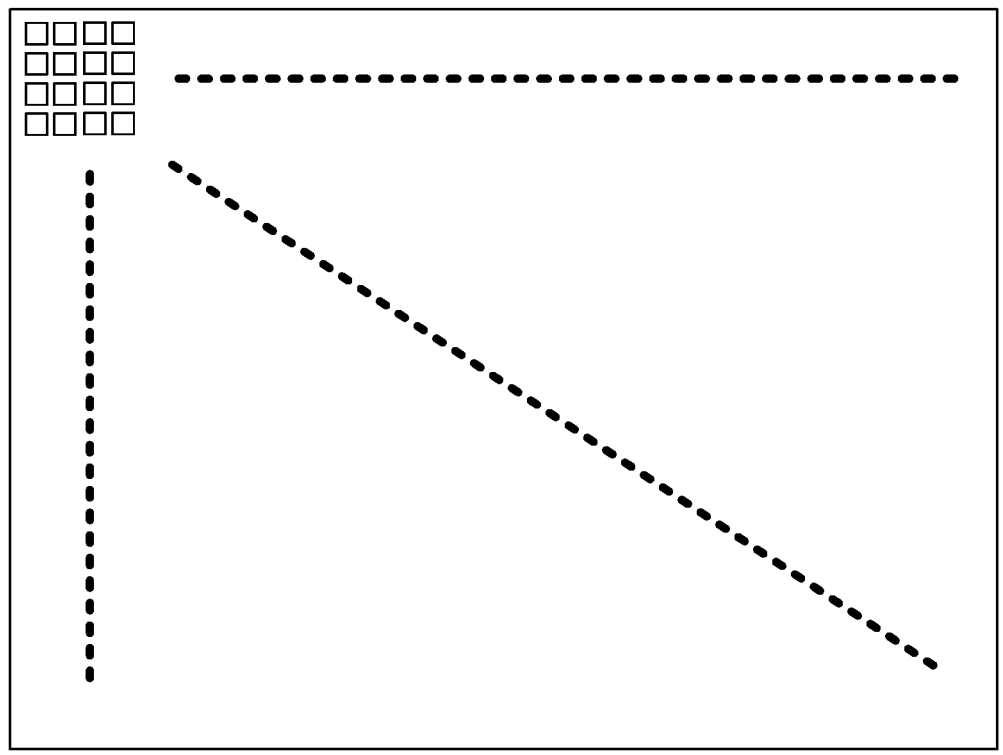

Referring now to FIGS. 8A and 8B, a description will be given of an example of a pixel arrangement in the image sensor 52 according to this embodiment. FIGS. 8A and 8B illustrate the pixel arrangement in the image sensor 52. FIG. 8A illustrates a configuration of four pixels corresponding to a repetition unit of the color filter, and FIG. 8B illustrates an overall arrangement of the pixels in the image sensor 52. FIG. 8A illustrates a pixel block 71 obtained by extracting four pixels (R pixel, G1 pixel, G2 pixel, and B pixel) of two horizontal pixels times two vertical pixels from the pixels of the image sensor 52.

The image sensor 52 according to this embodiment has a color filter having a Bayer array of primary colors and a microlens array formed so that a single microlens corresponds to each pixel. Each pixel is formed with two photoelectric conversion regions divided in a predetermined direction (which is herein a horizontal direction). This predetermined direction corresponds to a pupil division direction. Each of the two photoelectric conversion regions sharing the same microlens receives light beams from different regions in the exit pupil in the interchangeable lens 2 through the microlens. Hence, it is possible for a plurality of pixels in the horizontal direction to generate a focus-detecting image signal using the output of the photoelectric conversion region provided at the same position in the pixel.

In the example of FIG. 8A, an image signal (A image signal) obtained from the output of the left photoelectric conversion region group (region indicated by a broken line) and an image signal (B image signal) obtained from the output of the right photoelectric conversion region group (region indicated by a broken line) can be generated as a pair of image signals for the imaging plane phase difference AF. The image pickup apparatus 100a can detect a defocus amount based on a relative shift amount between the pair of image signals (A and B image signals). In the factory adjustment, the relationship between the defocus amount and the focus position of the captured image is measured and stored as the factory adjusting value ΔDfd in the nonvolatile memory 55. In the imaging plane phase difference AF, the focus lens 4 is moved based on the defocus amount.

The contrast AF is an autofocus performed by comparing contrast evaluation values at a plurality of lens positions with one another, similar to the first embodiment. In the contrast AF operation, the image captured by the image capturing circuit 56 for each of the plurality of lens positions is stored in the temporary memory 26, the contrast of a portion corresponding to the focus detecting point in the image is evaluated, and the maximum position of the contrast evaluation value is set to the focal point.

In this embodiment, each pixel is divided into two as illustrated in FIG. 8A. During normal image pickup other than the imaging plane phase difference AF, the two divided pixels are added to obtain a captured image. It is necessary for the contrast AF to obtain the contrast from an image equivalent to the final captured image. Therefore, an image obtained by adding the divided pixels is used in evaluating the contrast. In the imaging plane phase difference AF, the lens moving amount required for focusing is obtained from the defocus amount, so that a quick AF operation can be realized. On the other hand, in the contrast AF, the AF is performed based on the contrast evaluation value of the captured image itself, and thus the high focusing accuracy can be expected, but it is necessary to search for the in-focus point by moving the lens, the time necessary for the in-focus becomes longer. The image pickup apparatus 100a according to this embodiment has an AF adjusting value setting function in addition to the normal image pickup operation.

Figure 9:
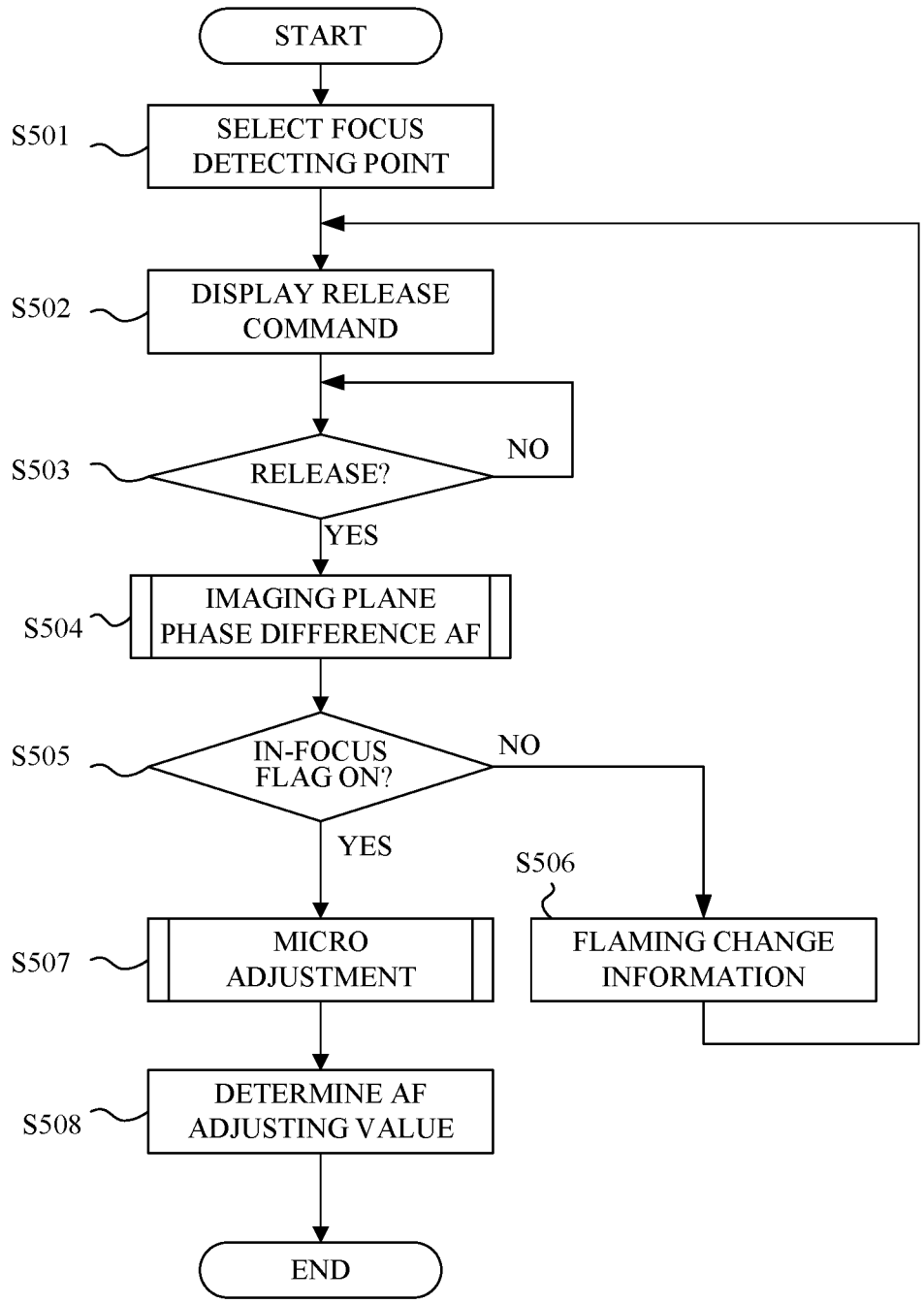
FIG. 9 is a flowchart showing AF adjusting value setting processing according to the second embodiment.

Referring now to FIG. 9, a description will be given of an AF adjusting value setting processing of the image pickup apparatus 100a according to this embodiment. FIG. 9 is a flowchart illustrating the AF adjusting value setting processing according to this embodiment. Each step in FIG. 9 is mainly executed by the system controller 53 or by each unit of the image pickup apparatus 100a based on a command from the system controller 53. The image pickup apparatus 100a according to this embodiment performs an automatic AF micro adjustment operation that automatically captures a plurality of images and corresponding defocus amounts during the operation and automatically sets the AF adjusting value. The steps S501 to S503, S505, S506, and S508 in FIG. 9 are the same as the steps S101 to S103, S105, S106, and S108 in FIG. 3, respectively, and thus a description thereof will be omitted.

Figure 10:
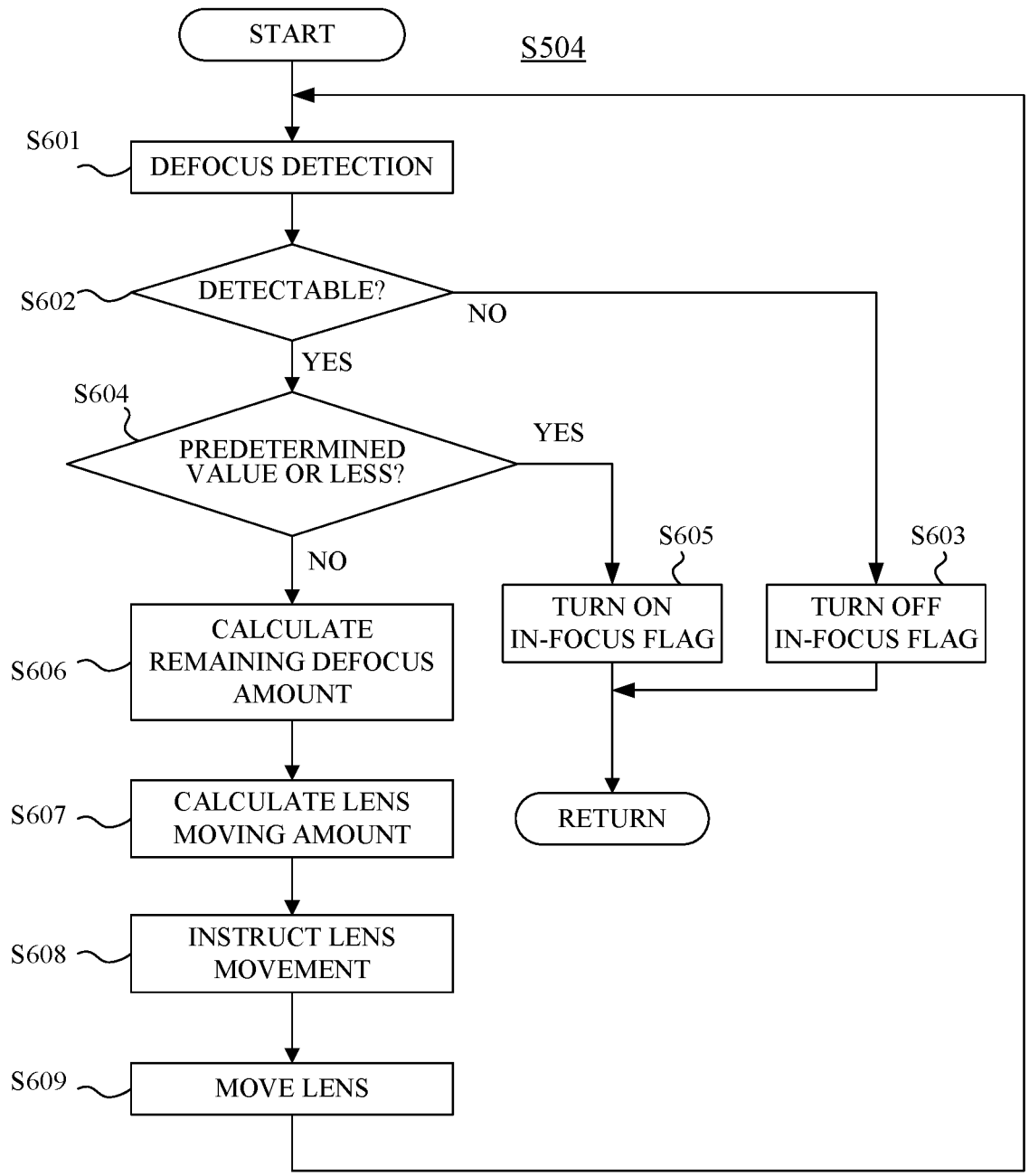
FIG. 10 is a flowchart illustrating an operation of an imaging surface phase difference AF according to the second embodiment.

In the step S504, the system controller 53 performs the imaging plane phase difference AF. Referring now to FIG. 10, a detailed description will be given of an operation of the imaging plane phase difference AF (step S504). FIG. 10 is a flowchart illustrating the operation of the imaging plane phase difference AF (subroutine of the step S504). Each step in FIG. 10 is mainly executed by the system controller 15 or by the image sensor 52 based on an instruction from the system controller 15.

First, in the step S601, the system controller 53 performs a correlation calculation based on a pair of image signals (A and B images) of the image sensor 52 to obtain a defocus amount (performs a defocus detection). The subsequent steps S602 to S609 are the same as the steps S202 to S209 in FIG. 4, respectively, and a description thereof will be omitted.

Figure 11:
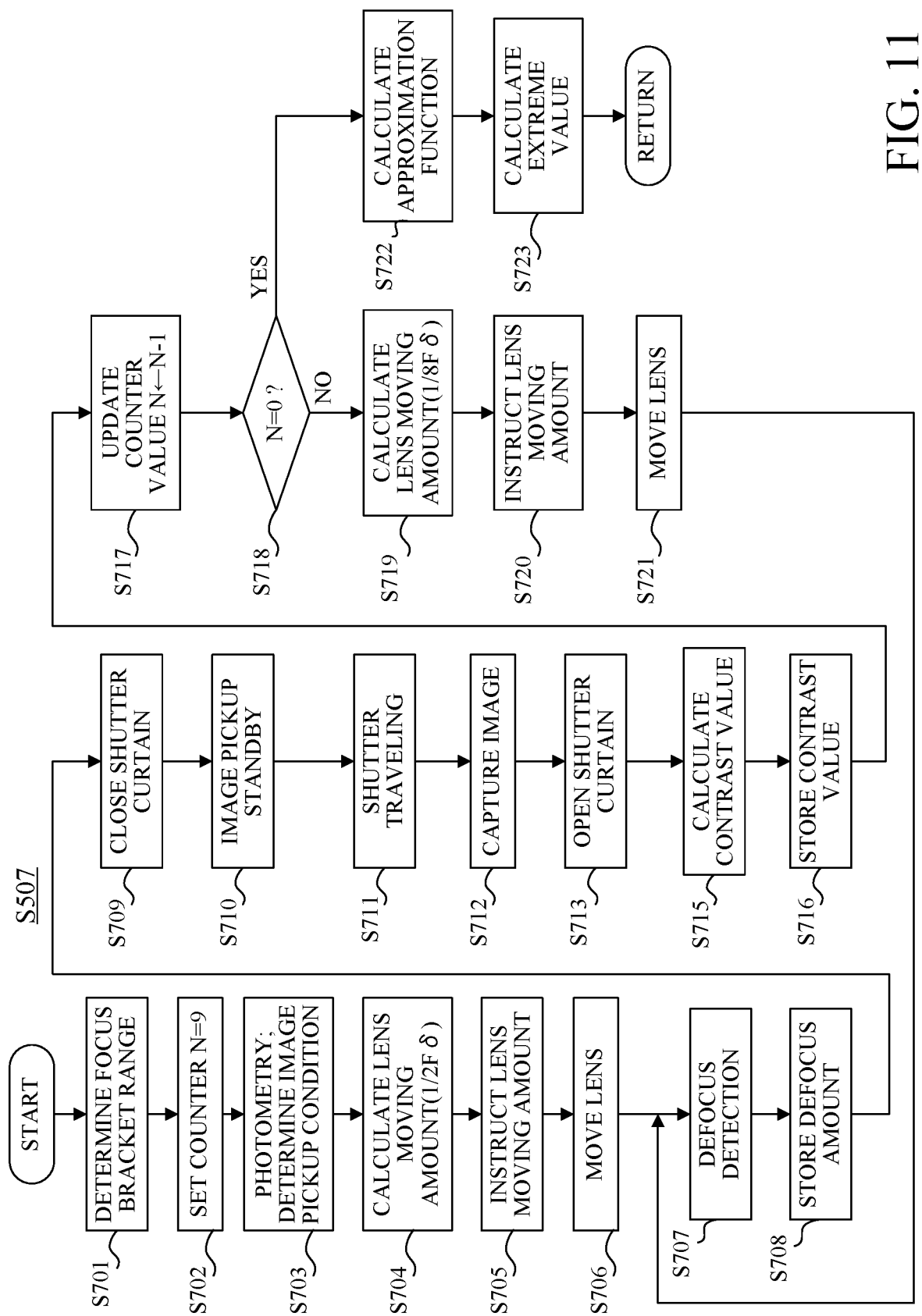
FIG. 11 is a flowchart showing the micro adjustment operation according to the second embodiment.

In the step S507 in FIG. 9, the system controller 53 performs the AF micro adjustment at the focus detecting point selected in the step S501. Referring now to FIG. 11, a description will be given of the operation of the micro adjustment (step S507) according to this embodiment. FIG. 11 is a flowchart showing the operation of the micro adjustment (subroutine of the step S507). Each step in FIG. 11 is mainly executed by the system controller 53 or by each unit of the image pickup apparatus 100a based on a command from the system controller 53. This embodiment performs the micro adjustment by capturing images at a plurality of positions (a plurality of lens positions) of the focus lens 4 and by simultaneously acquiring the defocus amount and the contrast evaluation value of the captured image.

First, in the step S701, similar to the step S301 in FIG. 5, the system controller 53 determines a focus bracket range (movement range and pitch of the focus lens 4). Next, in the step S702, similar to the step S302, the system controller 53 sets a counter.

Next, in the step S703, the system controller 53 meters the object light using the image sensor 52. Then, the system controller 53 determines the shutter speed and the sensitivity of the image sensor 52 based on the obtained photometric value.

Next, in the step S704, similar to the step S304, the system controller 53 calculates the lens moving amount to the initial lens position. Next, in the step S705, similar to step S305, the system controller 53 sends the lens moving amount determined in the step S704 to the lens control circuit 16. Next, in the step S706, similar to step S306, the lens control circuit 16 controls the lens driver 17 based on the lens moving amount instructed by the system controller 53, and moves the focus lens 4 to the instructed lens moving amount only in the optical axis direction.

Next, in the step S707, the system controller 53 (defocus amount calculator 53a) performs a correlation operation based on the pair of image signals of the image sensor 52, and detects (calculates) the defocus amount. Next, in the step S708, the system controller 53 correlates the calculated defocus amount and the counter value (N) with each other and stores them in the temporary memory 26.

Next, the image pickup apparatus 100a acquires an image for the contrast evaluation. First, in the step S709, the system controller 53 closes the shutter curtain using the shutter control means 54. Next, in the step S710, the system controller 53 resets the electric charges of the pixels in the image sensor 52 and sets them to the image pickup standby state similar to the step S310. Then, the system controller 53 sets the amplification rate of the image sensor 52 to the sensitivity determined in the step S703. Next, in the step S711, similar to the step S311, the system controller 53 uses the shutter controller 54 to move the focal plane shutter 12 at the shutter speed determined in the step S703 for the exposure. Next, in the step S712, similar to the step S312, the system controller 53 reads an image from the image sensor 52 using the image capturing circuit 56 and stores the image in the temporary memory 26. Next, in the step S713, the system controller 53 uses the shutter controller 54 to open the shutter curtain. The subsequent steps S715 to S723 are the same as the steps S315 to S323 in FIG. 5, respectively, and a description thereof will be omitted.

This embodiment can correct a difference between the maximum point position of the contrast evaluation value due to the individual difference of the interchangeable lens 2 and the defocus detection of the imaging plane phase difference AF. Instead of presenting a plurality of images to the user to request him to make a determination, the image pickup apparatus 100a calculates the contrast evaluation value. Thus, the burden of the user can be relieved while the determination error of the user can be eliminated. Even if the lens driving amount varies when images are captured for the lens correction, the relationship with the contrast evaluation value is determined based on the defocus amount obtained from the lens stop position, and the evaluation that does not depend on the lens stop position is available.

Thus, in each of the embodiments, the control apparatus (the system controllers 15 and 53) includes the first calculating unit, the second calculating unit, the third calculating unit, and the fourth calculating unit. The first calculating unit (the defocus amount calculators 15a and 53a) calculates the defocus amount by the focus detection using the phase difference method. The second calculating unit (evaluation value calculators 15b and 53b) calculates a contrast evaluation value of the image. The third calculating unit (function calculators 15c and 53c) calculates a function indicating a relationship between the defocus amount calculated at each of the plurality of lens positions and the contrast evaluation value. The fourth calculating unit (adjusting value calculators 15d and 53d) calculates the adjusting value $x_\alpha$ of the defocus amount based on the extreme value of the function.

The fourth calculating unit may calculate as the adjusting value the defocus amount corresponding to the extreme value of the function. The third calculating unit may calculate as the function an approximate function by the least-squares method using the defocus amount and the contrast evaluation value calculated at each of the plurality of lens positions. The control apparatus may include a memory (nonvolatile memory 22) for storing the adjusting value. The control apparatus may include a focus control unit (focus controller 15e) that performs the focus control based on the corrected defocus amount calculated using the adjusting value. The first calculating unit may calculate the defocus amount by the focus detection based on a light beam branched from the imaging light beam. The first calculating unit may calculate the defocus amount by the focus detection (imaging plane phase difference method) using an image signal from the image sensor.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) configured to perform the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The above embodiment can provide a control apparatus, an image pickup apparatus, and a control method, each of which can perform highly accurately a micro adjustment in the autofocus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-107888, filed on Jun. 10, 2019, which is hereby incorporated by reference herein in its entirety.

What is claimed is:

1. A control apparatus comprising:
   a first calculating unit configured to calculate a defocus amount by a focus detection of a phase difference method;
   a second calculating unit configured to calculate a contrast evaluation value of an image;
   a third calculating unit configured to calculate a function indicating a relationship between the defocus amount and the contrast evaluation value calculated at each of a plurality of lens positions; and
   a fourth calculating unit configured to acquire the defocus amount corresponding to a maximum value of the contrast evaluation value based on the function and calculate an adjusting value based on the defocus amount corresponding to the maximum value,
   wherein the third calculating unit calculates a relationship between the contrast evaluation value and the defocus amount calculated at a same lens position based on the defocus amount calculated at each of the plurality of lens positions and the contrast evaluation value calculated at each of the plurality of lens positions, and
   wherein at least one processor or circuit is configured to function as at least one of the units.

2. The control apparatus according to claim 1, wherein the fourth calculating unit calculates as the adjusting value the defocus amount corresponding to the maximum value.

3. The control apparatus according to claim 1, wherein the third calculating unit calculates as the function the maximum value by a least-squares method using the contrast evaluation value calculated at each of the plurality of lens positions.

4. The control apparatus according to claim 1, further comprising a memory configured to store the adjusting value.

5. The control apparatus according to claim 1, further comprising a focus control unit configured to perform a focus control based on a corrected defocus amount calculated using the adjusting value.

6. The control apparatus according to claim 1, wherein the first calculating unit calculates the defocus amount by the focus detection based on a light beam branched from an imaging light beam.

7. The control apparatus according to claim 1, wherein the first calculating unit calculates the defocus amount by the focus detection using an image signal from an image sensor.

8. An image pickup apparatus comprising:
   a sensor; and
   a control apparatus,
   wherein the control apparatus includes:
   a first calculating unit configured to calculate a defocus amount by a focus detection of a phase difference method based on a signal acquired by the sensor;
   a second calculating unit configured to calculate a contrast evaluation value of an image;
   a third calculating unit configured to calculate a function indicating a relationship between the defocus amount and the contrast evaluation value calculated at each of a plurality of lens positions; and
   a fourth calculating unit configured to acquire the defocus amount corresponding to a maximum value of the contrast evaluation value based on the function and calculate an adjusting value based on the defocus amount corresponding to the maximum value,
   wherein the third calculating unit calculates a relationship between the contrast evaluation value and the defocus amount calculated at a same lens position based on the defocus amount calculated at each of the plurality of lens positions and the contrast evaluation value calculated at each of the plurality of lens positions.

9. A control method comprising:
   calculating a defocus amount by a focus detection of a phase difference method;
   calculating a contrast evaluation value of an image;
   calculating a function indicating a relationship between the defocus amount and the contrast evaluation value calculated at each of a plurality of lens positions; and
   acquiring the defocus amount corresponding to a maximum value of the contrast evaluation value based on the function and calculating an adjusting value based on the defocus amount corresponding to the maximum value,
   wherein the calculating step of the function calculates a relationship between the contrast evaluation value and the defocus amount calculated at a same lens position based on the defocus amount calculated at each of the plurality of lens positions and the contrast evaluation value calculated at each of the plurality of lens positions.

10. A non-transitory computer-readable storage medium storing a program for causing a computer to execute the control method according to claim 9.

* * * * *